US011429948B2

(12) United States Patent
Lipshultz (10) Patent No.: US 11,429,948 B2
(45) Date of Patent: Aug. 30, 2022

(54) SYSTEM AND METHOD FOR INTER-BANK AND INTRA-BANK MOBILE BANKING COMMUNICATIONS AND TRANSFERS (71) Applicant: Capital One Financial Corporation, McLean, VA (US)

(72) Inventor: Andy Lipshultz, Sterling, VA (US)

(73) Assignee: CAPITAL ONE SERVICES, LLC, McLean, VA (US)

(*) Notice: Subject to any disclaimer, the term of this patent is extended or adjusted under 35 U.S.C. 154(b) by 254 days.

(21) Appl. No.: 14/687,154

(22) Filed: Apr. 15, 2015

(65) Prior Publication Data
US 2015/0294297 A1 Oct. 15, 2015

Related U.S. Application Data (60) Provisional application No. 61/979,637, filed on Apr. 15, 2014.

(51) Int. Cl.
*G06Q 20/32* (2012.01)
*G06Q 20/10* (2012.01)
*G06Q 40/02* (2012.01)

(52) U.S. Cl.
CPC ......... *G06Q 20/3223* (2013.01); *G06Q 20/10* (2013.01); *G06Q 20/326* (2020.05); *G06Q 40/02* (2013.01); *G06Q 20/321* (2020.05)

(58) Field of Classification Search
CPC .. G06Q 20/10; G06Q 20/3223; G06Q 20/385; G06Q 40/02; G06Q 209/3223
USPC .................................................. 705/35–45
See application file for complete search history.

(56) References Cited

U.S. PATENT DOCUMENTS

| | | | | |
|---|---|---|---|---|
| 6,012,048 A | * | 1/2000 | Gustin | G06Q 20/04 109/24.1 |
| 7,720,760 B1 | * | 5/2010 | Cook | G06Q 20/02 705/40 |
| 8,117,264 B1 | * | 2/2012 | Lamb | G06Q 10/107 709/206 |
| 9,256,795 B1 | * | 2/2016 | Gray | G06K 9/6857 |
| 9,262,754 B1 | * | 2/2016 | Jawharkar | G06Q 30/0633 |
| 9,704,157 B1 | * | 7/2017 | Ellis | G06K 7/1413 |
| 9,934,526 B1 | * | 4/2018 | Dhua | G06Q 30/0623 |
| 2002/0051575 A1 | * | 5/2002 | Myers | G06K 9/3283 382/202 |
| 2002/0052754 A1 | * | 5/2002 | Joyce | G06Q 30/0283 455/407 |
| 2002/0152176 A1 | * | 10/2002 | Neofytides | G06Q 30/06 705/64 |
| 2003/0004867 A1 | * | 1/2003 | Kight | G06Q 20/108 705/39 |
| 2005/0108155 A1 | * | 5/2005 | Gallagher | G06Q 20/1085 705/39 |

(Continued)

*Primary Examiner* — Robert R Niquette
(74) *Attorney, Agent, or Firm* — Troutman Pepper Hamilton Sanders LLP; Christopher J. Forstner; John A. Morrissett (57) ABSTRACT

Systems and methods for inter-bank and intra-application mobile banking communications and transfers including receiving a communication from a requesting device regarding a funds transfer, processing the communication to determine relevant funds transfer request details and initiating a communication window to allow fluid communication between a requestor and responder(s) regarding the funds transfer request.

18 Claims, 4 Drawing Sheets

(56) References Cited

U.S. PATENT DOCUMENTS

| | | | |
|---|---|---|---|
| 2007/0255653 A1* | 11/2007 | Tumminaro | G06Q 20/325 705/39 |
| 2007/0270124 A1* | 11/2007 | Johnson | H04L 12/66 455/406 |
| 2008/0083826 A1* | 4/2008 | Henry | G06Q 20/10 235/379 |
| 2009/0070263 A1* | 3/2009 | Davis | G06Q 20/32 705/44 |
| 2009/0081989 A1* | 3/2009 | Wuhrer | G06Q 20/405 455/406 |
| 2009/0209240 A1* | 8/2009 | Mahowald | H04M 1/72436 455/415 |
| 2010/0174646 A1* | 7/2010 | Cole | G06Q 40/02 705/43 |
| 2010/0174647 A1* | 7/2010 | Kowalchyk | G06Q 20/3223 705/44 |
| 2011/0196797 A1* | 8/2011 | Liwerant | G06Q 20/32 705/71 |
| 2012/0030098 A1* | 2/2012 | Bulawa | G06Q 20/38 705/40 |
| 2012/0054102 A1* | 3/2012 | Schwartz | G06Q 20/3255 705/44 |
| 2012/0116967 A1* | 5/2012 | Klein | G06Q 20/108 705/42 |
| 2012/0136780 A1* | 5/2012 | El-Awady | G06Q 20/14 705/40 |
| 2012/0191606 A1* | 7/2012 | Milne | G06Q 10/101 705/44 |
| 2012/0221467 A1* | 8/2012 | Hamzeh | G06Q 20/385 705/40 |
| 2013/0018785 A1* | 1/2013 | Dolphin | G06Q 20/3223 705/40 |
| 2013/0060678 A1* | 3/2013 | Oskolkov | G06Q 20/10 705/39 |
| 2013/0060689 A1* | 3/2013 | Oskolkov | G06Q 20/10 705/42 |
| 2013/0060690 A1* | 3/2013 | Oskolkov | G06Q 20/405 705/43 |
| 2013/0060708 A1* | 3/2013 | Oskolkov | G06Q 20/10 705/75 |
| 2013/0282577 A1* | 10/2013 | Milne | G06Q 20/384 705/44 |
| 2013/0347074 A1* | 12/2013 | Vellozo Luz | G06F 21/36 726/4 |
| 2014/0074724 A1* | 3/2014 | Gordon | G06Q 20/10 705/44 |
| 2014/0112527 A1* | 4/2014 | Nister | G06K 9/3266 382/103 |
| 2014/0129428 A1* | 5/2014 | Tyler | G06Q 30/06 705/39 |
| 2014/0156435 A1* | 6/2014 | Rahman | G06Q 20/385 705/44 |
| 2014/0156512 A1* | 6/2014 | Rahman | G06Q 20/326 705/39 |
| 2014/0207675 A1* | 7/2014 | Rosendahl | G06F 7/00 705/44 |
| 2014/0244498 A1* | 8/2014 | Shishkov | G06Q 20/108 705/42 |
| 2014/0337175 A1* | 11/2014 | Katzin | G06Q 30/00 705/26.62 |
| 2015/0178855 A1* | 6/2015 | Flynn | G06Q 30/04 705/30 |

* cited by examiner

SYSTEM AND METHOD FOR INTER-BANK AND INTRA-BANK MOBILE BANKING COMMUNICATIONS AND TRANSFERS

CROSS-REFERENCE TO RELATED APPLICATIONS

This application contains subject matter related to and claims the benefit of U.S. Provisional Patent Application No. 61/979,637, filed on Apr. 15, 2014, the entire contents of which is incorporated herein by reference.

FIELD OF THE DISCLOSURE

The present disclosure relates to systems and methods for integrating messaging platforms and mobile banking platforms to enable inter-bank and intra-application mobile banking communications and transfers.

BACKGROUND OF THE DISCLOSURE

Currently, discussions regarding inter and intra-bank transfers of funds from a first account to a second account occur outside of a mobile or online application where the actual funds transfers occur. Requestors must call, text, and/or email individuals in order to request funds to be transferred into the requestor's account. The actual transfer then occurs outside of the conversation.

These and other drawbacks exist.

SUMMARY OF THE DISCLOSURE

Various embodiments of the present disclosure provide systems and methods for inter-bank and intra-application mobile banking communications and transfers. In an example embodiment, a method for inter-bank and/or intra-application mobile banking communications and transfers may include initiating communication between a requestor and a responder including, for example, opening, on a requestor device, a mobile application or website to begin inter/intra-bank transfer requests; receiving request data to initiate a request for a funds transfer, where the request includes at least the request amount and a recipient (responder) of the request and determining whether the responder is an existing contact within the mobile application and/or website. When a responder is not an existing contact, the initiation of communication may include searching user application contacts through contacts stored on the requestor device or remotely associated with the requestor device, presenting contact options, and receiving a contact selection or manually input contact. Once a contact has been determined (or when a contact is an existing contact), the request may be translated to identify and present key features of the request including at least the requested amount and whether the transfer is an intra-bank transfer or an inter-bank transfer. When a transfer is an intra-bank transfer, the responder may receive an in-app or website notification associated with the bank and when a transfer is an inter-bank transfer, the responder may receive a text and/or email notification with a link to an inter-bank transfer registration. An inter-bank transfer responder may utilize the inter-bank transfer registration website to transmit account details to the requestor bank and the communication may proceed as an "intra-bank" communication once the responder bank and account have been verified.

The system and methods may also include receiving a reply from the responder including an execution and affirmation of the funds transfer, a reply with changes to the request, a replay with a question or comment, and/or a rejection of the funds transfer with rejection details. When responder agrees to execute the funds transfer, the responder may specify an account to execute the funds transfer, provide restrictions associated with the funds including, for example, where and when the funds may be used, and provide a receipt of the funds transfer based on a responder and/or a requestor format. When responder replies to the request, the reply may include, for example, restrictions, an alternative funds transfer amount, and/or an alternative to traditional currency (e.g., points, rewards, offers, and the like). When responder rejects the request, the responder may include a message with the rejection, such as an indication that a funds transfer may occur in the future and a calendar reminder for the requester and/or responder.

In various aspects, multiple iterations of requests and/or replies between requester and responder. The systems and methods may include a multi-window display on a requestor device and a responder device, where the multi-window display includes a message window and a funds transfer window. A message window may include the request and/or reply messages transmitted between the requestor and responder. A funds transfer window may include funds transfer data, such as a funds transfer amount, funds transfer account(s), and/or funds transfer details (e.g., restrictions, alternative currency options, and the like). Additionally, a print option may be available either in a separate window or within a message window and/or a funds transfer window. Additionally, an ability to save and archive the conversation in data storage associated with a user, a financial institution, and/or a third party system may be available.

In various aspects, multiple responders may be used, such as, for example in an auction setting or a group request. For example, a requester may be requesting bids from an auction audience made up of a plurality of responders. In another example, a requestor may be requesting payment for joining a group, such as a sports league. In an auction setting, each responder reply may be a "reply all" reply so that each auction audience responder can view the auction bid and details associated with the auction big (e.g., number of times responder has bid, timing since last bid, and the like). In a group request, each responder may reply all and/or reply to a selected requestor and/or responder.

In various aspects, additional request details and/or reply details, such as for example, an image, picture, video, invoice, calendar request, and/or voice message. For example, where a requestor is requesting a funds transfer for a specific purchase, the requestor may include an image, video, or audio description of the purchase. In another example, where a funds transfer request is in relation to services performed or good sold by requestor, the request may include an invoice. In another example, where a requestor is requesting a funds transfer from a group for sports participation, the request may include calendar reminder(s) for practice and/or game events.

BRIEF DESCRIPTION OF THE DRAWINGS

Various embodiments of the present disclosure, together with further objects and advantages, may best be understood by reference to the following description taken in conjunction with the accompanying drawings, in the several figures of which like reference numerals identify like elements, and in which.

DETAILED DESCRIPTION OF THE EMBODIMENTS

The following description is intended to convey a thorough understanding of the embodiments described by providing a number of specific example embodiments and details involving systems and methods for inter-bank and intra-application mobile banking communications and transfers. It should be appreciated, however, that the present disclosure is not limited to these specific embodiments and details, which are examples only. It is further understood that one possessing ordinary skill in the art, in light of known systems and methods, would appreciate the use of the invention for its intended purposes and benefits in various embodiments, depending on specific design and other needs. Although the term bank is used herein, any financial institution may be involved in the disclosed communications and/or transfers. Moreover, a financial institution and system supporting a financial institution are used as examples for the disclosure. The disclosure is not intended to be limited to financial institutions only.

According to the various embodiments of the present disclosure, systems and methods are disclosed for inter-bank and/or intra-application mobile banking communications and transfers. The systems and methods depicted in, for example, FIGS. 1 through 4 allow a requestor to communicate with and receive a funds transfer from a responder using a common communication interface. For example, common communication interfaces may include a messaging platform that is standalone and/or integrated within a native application (e.g., a mobile banking application) as shown and described herein. The systems and methods may be used in inter-bank communications and transfers where the requestor and the responder(s) maintain accounts at different financial institutions and/or intra-bank communications and/or transfers where the requestor and the responder(s) maintain accounts at the same financial institution.

Figure 1:
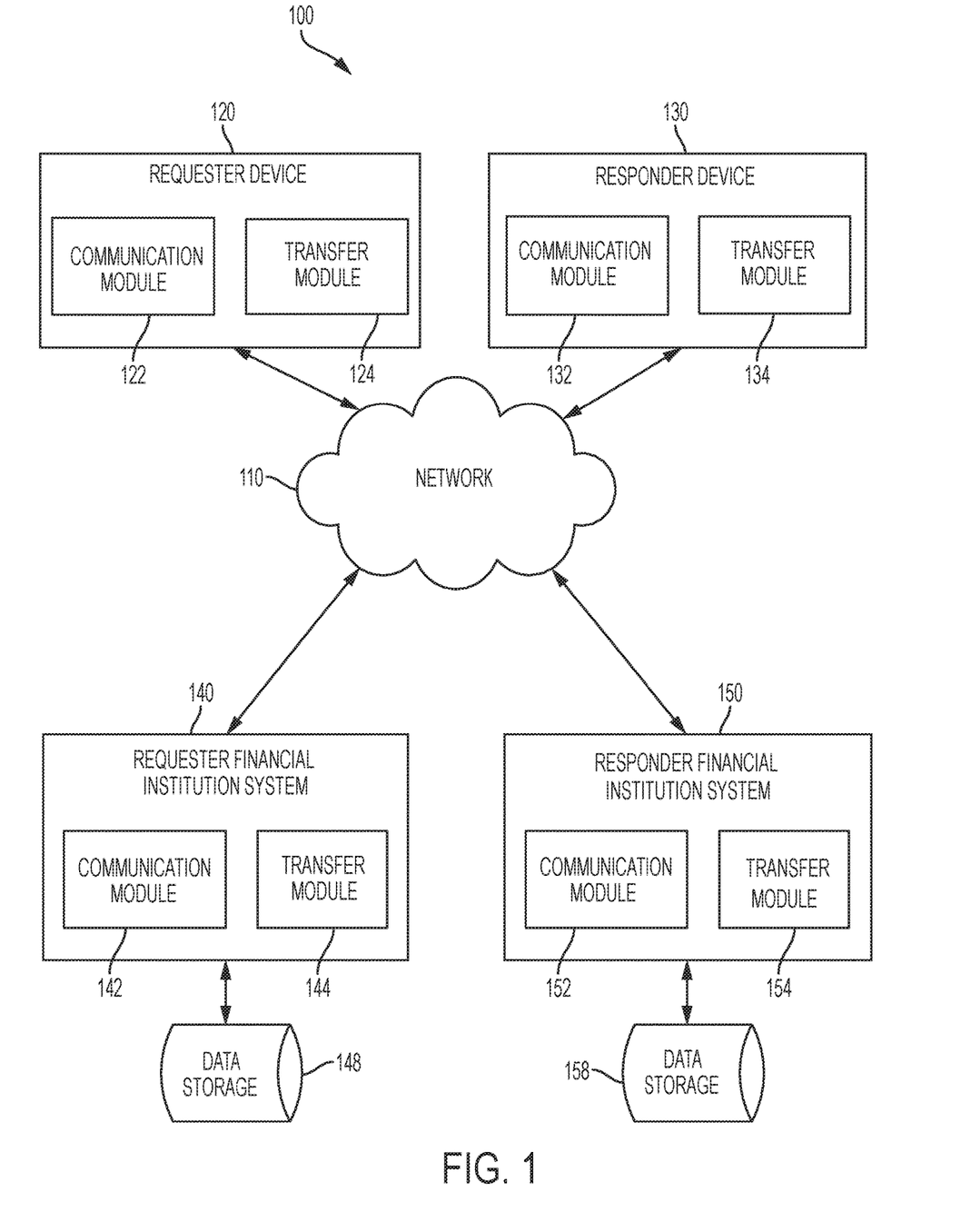
FIG. 1 is a diagram illustrating an example system for inter-bank and intra-application mobile banking communications and transfers, consistent with various embodiments.

FIG. 1 is a diagram illustrating and example system for inter-bank and/or intra-application mobile banking communications and transfers. As shown in FIG. 1, an example system 100 may include one or more requestor devices 120, one or more responder devices 130, one or more requestor financial institutions 140, and/or one or more responder financial institutions 150 connected over one or more networks 110. As mentioned herein, the requestor and responder(s) may belong to (e.g., have accounts at) the same financial institution. Accordingly, the requestor financial institution 140 and the responder financial institution 150 may be the same financial institution.

For example, network 110 may be one or more of a wireless network, a wired network or any combination of wireless network and wired network. For example, network 110 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g or any other wired or wireless network for transmitting and receiving a data signal.

In addition, network 110 may include, without limitation, telephone lines, fiber optics, IEEE Ethernet 902.3, a wide area network ("WAN"), a local area network ("LAN"), or a global network such as the Internet. Also network 140 may support an Internet network, a wireless communication network, a cellular network, or the like, or any combination thereof. Network 110 may further include one network, or any number of the example types of networks mentioned above, operating as a stand-alone network or in cooperation with each other. Network 110 may utilize one or more protocols of one or more network elements to which they are communicatively coupled. Network 110 may translate to or from other protocols to one or more protocols of network devices. Although network 110 is depicted as a single network, it should be appreciated that according to one or more embodiments, network 110 may comprise a plurality of interconnected networks, such as, for example, the Internet, a service provider's network, a cable television network, corporate networks, and home networks.

Requestor device 120 and/or responder device 130 may be any type of computer and/or mobile device. Requestor financial institution 140 and/or responder financial institution 150 may include systems associated with financial institutions that house and/or maintain financial accounts (for example in storage 146, 156) and provide financial transactions such as payments, funds transfers, withdrawals, deposits, credit lines, loans, and the like. In various embodiments, a requestor financial institution 140 and/or a responder financial institution 150 may issue credit, debit, and/or stored value cards, for example. Requestor financial institution 140 and/or responder financial institution 150 also may enable mobile payments through, for example, ApplePay, Google Wallet and/or the like. Requestor financial institution 140 and/or a responder financial institution 150 may include, by way of example and not limitation, depository institutions (e.g., banks, credit unions, building societies, trust companies, mortgage loan companies, pre-paid gift cards or credit cards, etc.), contractual institutions (e.g., insurance companies, pension funds, mutual funds, etc.), investment institutions (e.g., investment banks, underwriters, brokerage funds, etc.), and other non-bank financial institutions (e.g., pawn shops or brokers, cashier's check issuers, insurance firms, check-cashing locations, payday lending, currency exchanges, microloan organizations, crowd-funding or crowd-sourcing entities, third-party payment processors, etc.). Example financial institutions may include, Capital One, Bank of America, Wells Fargo, Citibank, community banks, and the like.

For example, requestor device 120, responder device 130, requestor financial institution 140, and/or responder financial institution 150 may include, for example, one or more mobile devices, such as, for example, personal digital assistants (PDA), tablet computers and/or electronic readers (e.g., iPad, Kindle Fire, Playbook, Touchpad, etc.), telephony devices, smartphones, cameras, music playing devices (e.g., iPod, etc.), televisions, set-top-box devices, and the like. Requestor device 120, responder device 130, requestor financial institution 140, and/or responder financial institution 150 also may include a network-enabled computer system and/or device. As referred to herein, a network-enabled computer system and/or device may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The network-enabled computer systems may execute one or more software applications to, for example, receive data as input from an entity accessing the network-enabled computer system, process received data, transmit data over a network, and receive data over a network. Requestor device 120, responder device 130, requestor financial institution 140, and/or responder financial institution 150 may include at least one central processing unit (CPU), which may be configured to execute computer program instructions to perform various processes and methods. Requestor device 120, responder device 130, requestor financial institution 140, and/or responder financial institution 150 may include data storage, including for example, random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, or any other storage mechanism.

Requestor device 120, responder device 130, requestor financial institution 140, and/or responder financial institution 150 may further include, for example, a processor, which may be several processors, a single processor, or a single device having multiple processors. Although depicted as single elements, it should be appreciated that according to one or more embodiments, requestor device 120, responder device 130, requestor financial institution 140, and/or responder financial institution 150 may comprise a plurality of requestor devices 120, responder devices 130, requestor financial institutions 140, and/or responder financial institutions 150.

Requestor device 120 and/or responder device 130 also may be a mobile device: For example, a mobile device may include an iPhone, iPod, iPad from Apple® or any other mobile device running Apple's iOS operating system, any device running Google's Android® operating system, including for example, Google's wearable device, Google Glass, any device running Microsoft's Windows® Mobile operating system, and/or any other smartphone or like wearable mobile device.

As shown in FIG. 1, each requestor device 120, responder device 130, requestor financial institution 140, and/or responder financial institution 150 may include various modules. As used herein, the term "module" may be understood to refer to computer executable software, firmware, hardware, or various combinations thereof. It is noted that the modules shown and described herein are intended as examples. The modules may be combined, integrated, separated, or duplicated to support various applications. Also, a function described herein as being performed at a particular module may be performed at one or more other modules and by one or more other devices instead of or in addition to the function performed at the particular module. Further, the modules may be implemented across multiple devices or other components local or remote to one another. Additionally, the modules may be moved from one device and added to another device, or may be included in both devices.

Requestor device 120 and/or responder device 130 may include, for example, a communications module 122, 132 and a transfer module 124, 134. The communications and transfer modules may include aspects of a mobile device operating system, messaging platform, and/or native application associated with a financial institution and/or the like as shown and describe herein. Communication module 122, 132 may enable communication between the components of system 100. Communication module 122, 132 may include hardware, software, and/or firmware that may enable communication between requestor device 120, responder device 130, requestor financial institution 140, and/or responder financial institution 150. For example, communication module 122, 132 may include an input/output interface and input/output devices driven by a processor. An input/output device and/or interface may include, for example, a transceiver, modems, network interfaces, buses, CD-ROM, keyboard, mouse, microphone, camera, touch screen, printers, USB flash drives, speakers, and/or any other device configured to receive and transmit electronic data. Communication module 122, 132 may include for example, I/O devices, which may be configured to provide input and/or output to requestor device 120 and/or responder device 130 (e.g., keyboard, mouse, display, speakers, printers, modems, network cards, etc.). Communication module 122, 132 also may include antennas, network interfaces that may provide or enable wireless and/or wire line digital and/or analog interface to one or more networks, such as network 110, over one or more network connections, a power source that provides an appropriate alternating current (AC) or direct current (DC) to power one or more components of requestor device 120 and/or responder device 130, and a bus that allows communication among the various components of requestor device 120 and/or responder device 130. Communication module 122, 132 may include texting and messaging software, such as, for example, iMessage, SMS messaging, WhatsApp, Google Hangouts, and the like. Communication module 122, 132 may include a display, which may include for example output devices, such as a printer, display screen (e.g., monitor, television, and the like), speakers, projector, and the like. Although not shown, each requestor device 120 and/or responder device 130 may include one or more encoders and/or decoders, one or more interleavers, one or more circular buffers, one or more multiplexers and/or de-multiplexers, one or more permuters and/or depermuters, one or more encryption and/or decryption units, one or more modulation and/or demodulation units, one or more arithmetic logic units and/or their constituent parts, and the like.

Transfer module 124, 134 may include hardware and/or software to enable transfer-related features and functions to occur as discussed with reference to FIGS. 3 and 4. For example, transfer module 124, 134 may include at least one processor configured to translate communications into transfer-related data that may be transmitted to requestor device 120, responder device 130, requestor financial institution 140, and/or responder financial institution. Transfer module 124, 134 may and configure presentations of the translated data obtained from communications module 122, 132 and receive selections associated with a requested transfer. Transfer module may cooperating and/or instruct a backend of a financial institution (e.g., backend 218 of FIG. 2) to perform and/or complete a funds transfer.

Requestor financial institution 140 and/or responder financial institution 150 may include a communication module 142, 152 and a transfer module 144, 154. The communication and transfer modules of financial institutions may include components of financial institution server systems as shown and described, for example, in FIGS. 1 and 2. Communication module 142, 152 may include hardware, software, and/or firmware that may enable communication between requestor device 120, responder device 130, requestor financial institution 140, and/or responder financial institution 150. For example, communication module 142, 152 may include an input/output interface and input/output devices driven by a processor. An input/output device and/or interface may include, for example, a transceiver, modems, network interfaces, buses, CD-ROM, keyboard, mouse, microphone, camera, touch screen, printers, USB flash drives, speakers, and/or any other device configured to receive and transmit electronic data. Communication module 142, 152 may include texting and messaging software, such as, for example, iMessage, SMS messaging, WhatsApp, Google Hangouts, and the like. Communication module 142, 152 may include for example, I/O devices, which may be configured to provide input and/or output to requestor financial institution 140 and/or responder financial institution 150 (e.g., keyboard, mouse, display, speakers, printers, modems, network cards, etc.). Communication module 142, 152 also may include antennas, network interfaces that may provide or enable wireless and/or wire line digital and/or analog interface to one or more networks, such as network 110, over one or more network connections, a power source that provides an appropriate alternating current (AC) or direct current (DC) to power one or more components of requestor financial institution 140 and/or responder financial institution 150, and a bus that allows communication among the various components of requestor financial institution 140 and/or responder financial institution 150. Communication module 142, 152 may include a display, which may include for example output devices, such as a printer, display screen (e.g., monitor, television, and the like), speakers, projector, and the like. Although not shown, each requestor financial institution 140 and/or responder financial institution 150 may include one or more encoders and/or decoders, one or more interleavers, one or more circular buffers, one or more multiplexers and/or de-multiplexers, one or more permuters and/or depermuters, one or more encryption and/or decryption units, one or more modulation and/or demodulation units, one or more arithmetic logic units and/or their constituent parts, and the like.

Communications module 142, 152 may also include at least one processor to determine a responder contact associated with a communication and may receive data indicative of a name and determine whether the name is associated with an inter-bank transfer or an intra-bank transfer. Communications module 142, 152, once having determined the type of transfer, may transmit a proper communication to a responder device 130 and/or requestor device 120 based on the determined type of transfer. For example, where a transfer is an intra-bank transfer, communication module 142 may transmit an in-app message and/or a website message and include a push notification to alert the responder device 130 that a funds transfer has been requested associated with the responder device 130. Also, when a transfer is an inter-bank transfer, communication module 142 may transmit an email and/or text message to responder device 130 to alert the responder device 130 that a fund transfer has been requested associated with the responder device 130.

Figure 3:
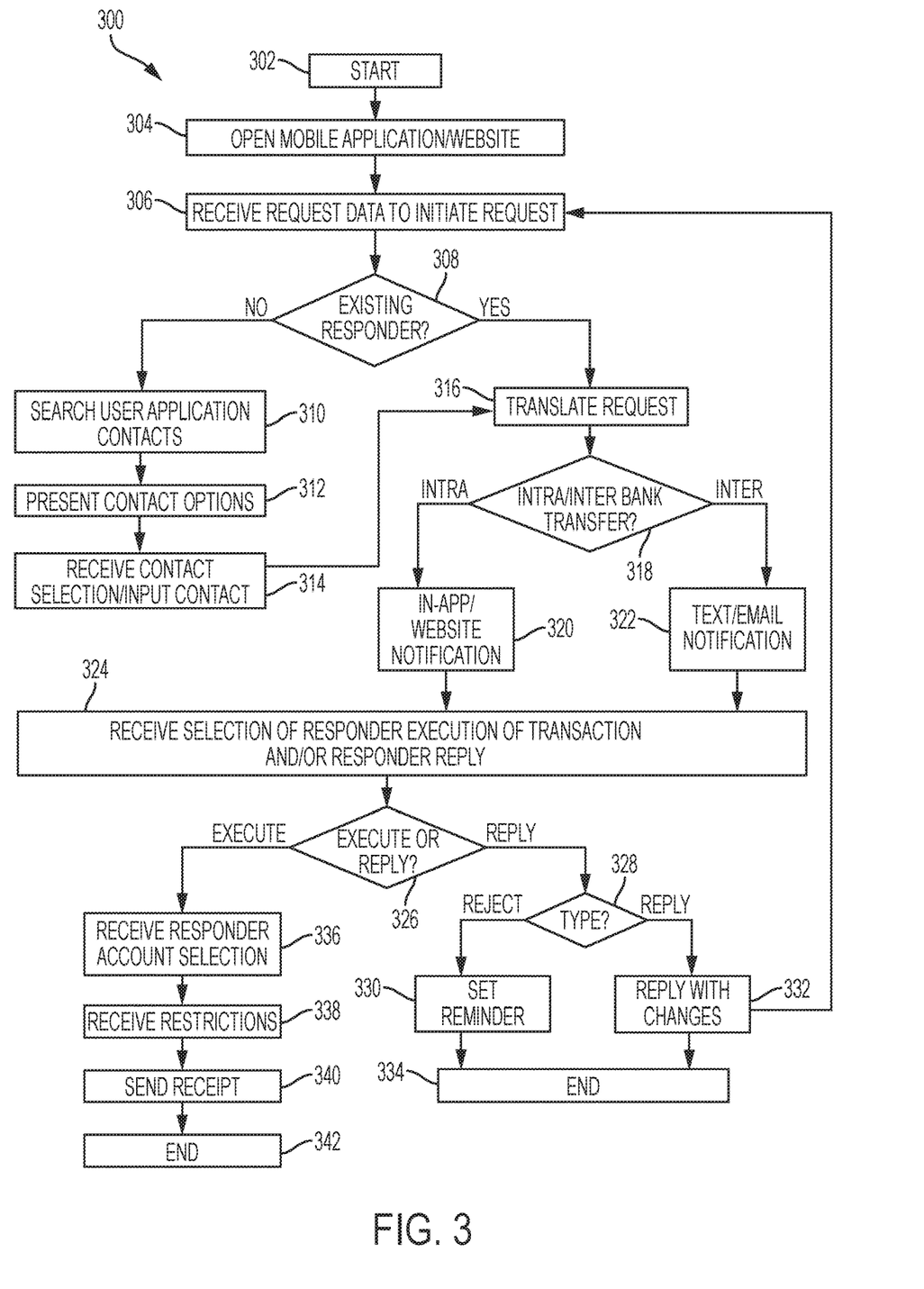
FIG. 3 is a flowchart illustrating an example method inter-bank and intra-application mobile banking communications and transfers, consistent with various embodiments.
Figure 4:
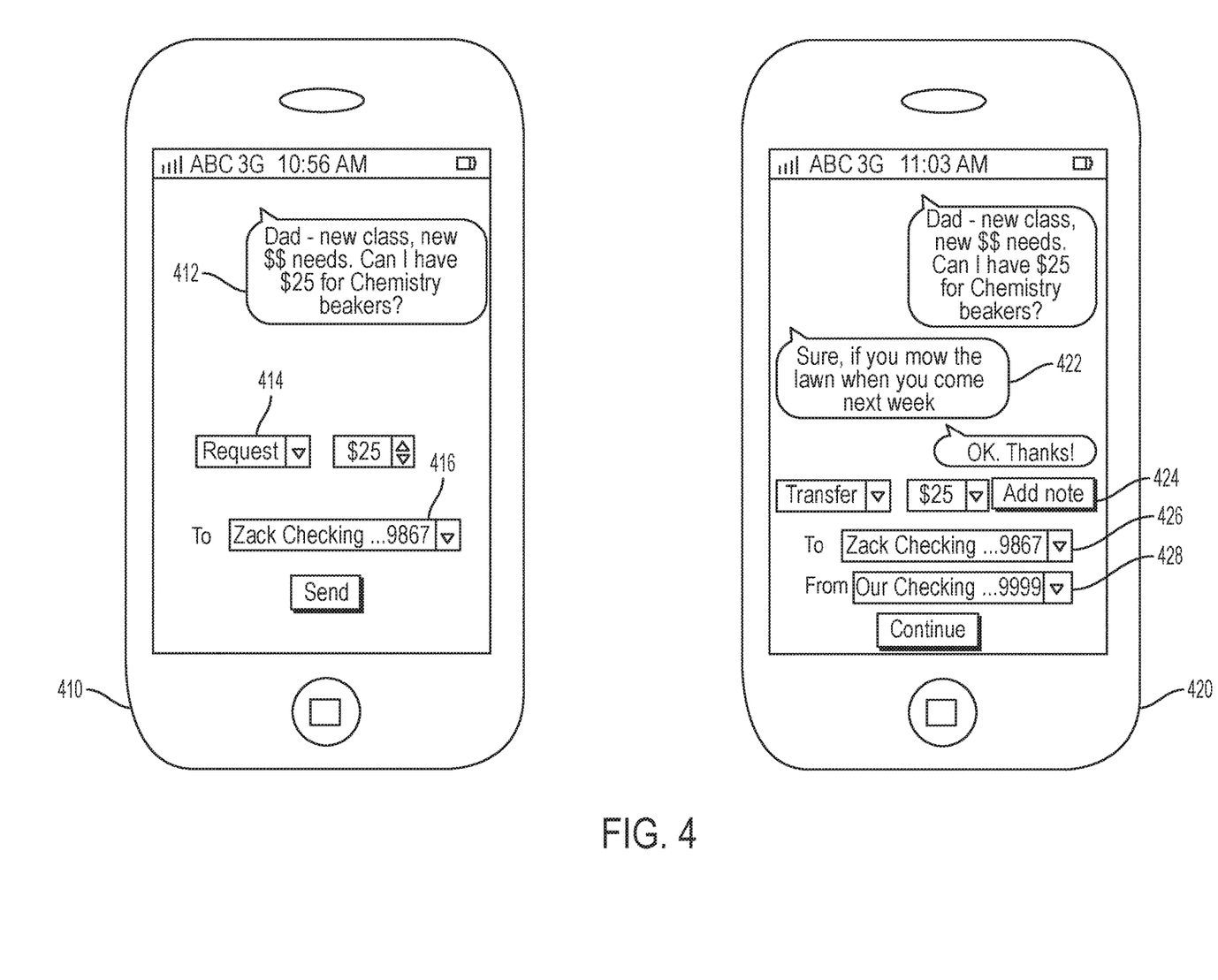
FIG. 4 illustrates example user interfaces for use with systems and methods for inter-bank and intra-application mobile banking communications and transfers, consistent with various embodiments.

Transfer module 144, 154 may include hardware and/or software to enable transfer-related features and functions to occur as discussed, for example, with reference to FIGS. 3 and 4. For example, transfer module 144, 154 may include at least one processor configured to translate communications into transfer-related data that may be transmitted to requestor device 120, responder device 130, requestor financial institution 140, and/or responder financial institution. Translation may occur using software such as optical character recognition (OCR) software and/or machine learning technologies. Transfer module 144, 154 may include at least one processor configured to transfer funds from a responder financial account held with responder financial institution 150 to a requestor financial account held with a requestor financial institution 140. Transfer module 144, 154 also may be configured to provide any details associated with the transfer, such as, for example restrictions on when and where the funds transfer may be used, a day and time of funds transfer, a receipt of transfer, an invoice associated with the transfer, a calendar event associated with the transfer, a picture and/or video associated with the transfer, and the like. Transfer module 144, 154 also may include at least one processor to process inter-bank transfers using responder and requestor account details associated with the financial accounts involved in the funds transfer.

Figure 2:
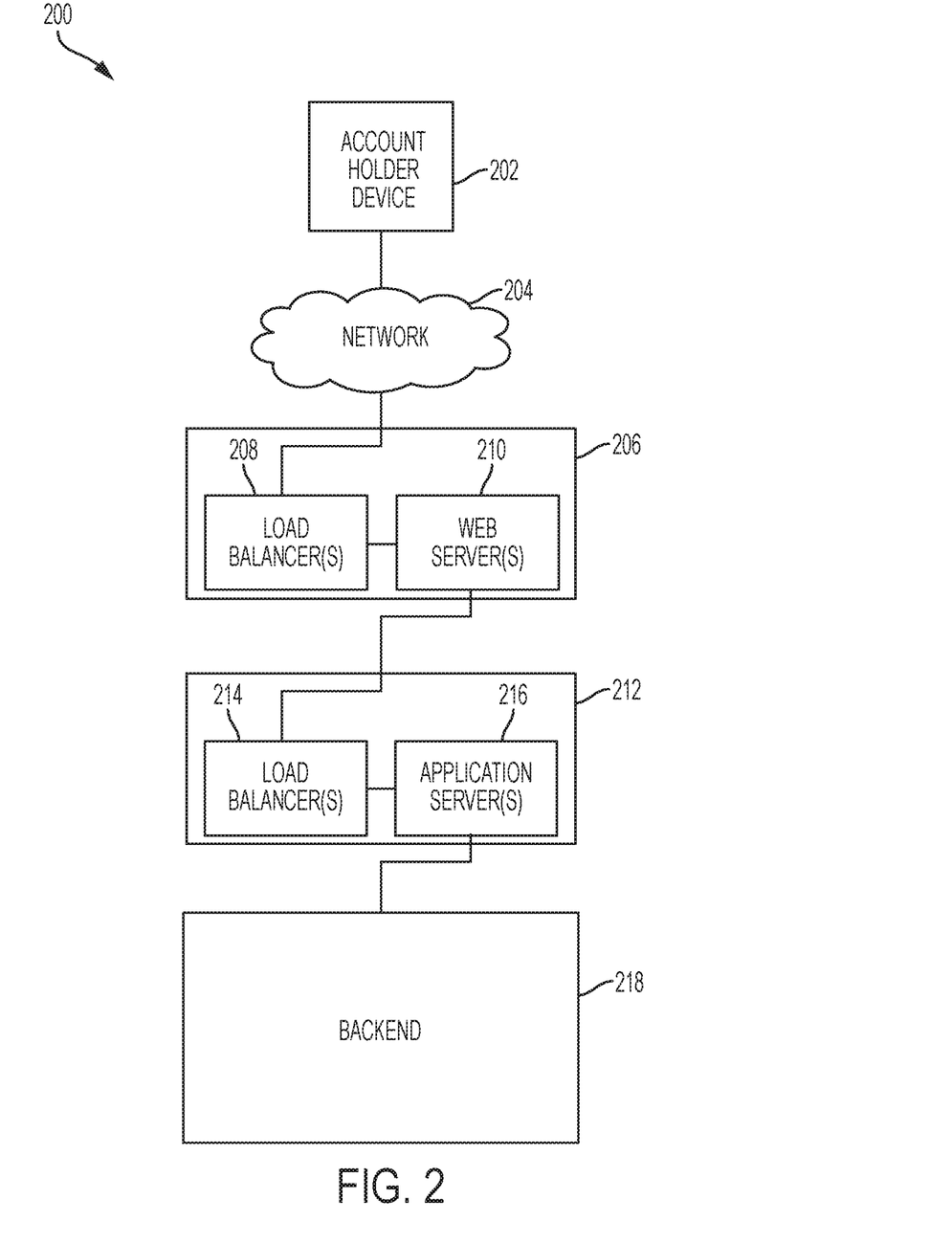
FIG. 2 is a diagram illustrating an example system for inter-bank and intra-application mobile banking communications and transfers, consistent with various embodiments.

FIG. 2 depicts an example account holder system. The example system 200 in FIG. 2 may enable a financial institution, for example, to provide network services to its customers including, for example, inter-bank and intra-bank mobile banking communication and transfers. As shown in FIG. 2, system 200 may include an account holder device 202, a network 204, a front-end controlled domain 206, a back-end controlled domain 212, and a backend 218. Front-end controlled domain 206 may include one or more load balancers 208 and one or more web servers 210. Back-end controlled domain 212 may include one or more load balancers 214 and one or more application servers 216. Account holder device 202 may be similar to requestor device 120 and/or responder device 130.

Account holder device 202 may be a network-enabled computer: As referred to herein, a network-enabled computer may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The one or more network-enabled computers of the example system 200 may execute one or more software applications to enable, for example, network communications.

Account holder device 202 also may be a mobile device: For example, a mobile device may include an iPhone, iPod, iPad from Apple® or any other mobile device running Apple's iOS operating system, any device running Google's Android® operating system, including for example, Google's wearable device, Google Glass, any device running Microsoft's Windows® Mobile operating system, and/or any other smartphone or like wearable mobile device.

Network 204 may be one or more of a wireless network, a wired network, or any combination of a wireless network and a wired network. For example, network 204 may include one or more of a fiber optics network, a passive optical network, a cable network, an Internet network, a satellite network, a wireless LAN, a Global System for Mobile Communication (GSM), a Personal Communication Service (PCS), a Personal Area Networks, (PAN), D-AMPS, Wi-Fi, Fixed Wireless Data, IEEE 802.11b, 802.15.1, 802.11n, and 802.11g or any other wired or wireless network for transmitting and receiving a data signal.

In addition, network 204 may include, without limitation, telephone lines, fiber optics, IEEE Ethernet 902.3, a wide area network (WAN), a local area network (LAN) or a global network such as the Internet. Also, network 204 may support an Internet network, a wireless communication network, a cellular network, or the like, or any combination thereof. Network 204 may further include one network, or any number of example types of networks mentioned above, operating as a stand-alone network or in cooperation with each other. Network 204 may utilize one or more protocols of one or more network elements to which they are communicatively couples. Network 204 may translate to or from other protocols to one or more protocols of network devices. Although network 204 is depicted as a single network, it should be appreciated that according to one or more embodiments, network 204 may comprise a plurality of interconnected networks, such as, for example, the Internet, a service provider's network, a cable television network, corporate networks, and home networks.

Front-end controlled domain 206 may be implemented to provide security for backend 218. Load balancer(s) 208 may distribute workloads across multiple computing resources, such as, for example computers, a computer cluster, network links, central processing units or disk drives. In various embodiments, load balancer(s) 210 may distribute workloads across, for example, web server(S) 216 and/or backend 218 systems. Load balancing aims to optimize resource use, maximize throughput, minimize response time, and avoid overload of any one of the resources. Using multiple components with load balancing instead of a single component may increase reliability through redundancy. Load balancing is usually provided by dedicated software or hardware, such as a multilayer switch or a Domain Name System (DNS) server process.

Load balancer(s) 208 may include software that monitoring the port where external clients, such as, for example, account holder device 202, connect to access various services of a financial institution, for example. Load balancer(s) 208 may forward requests to one of the application servers 216 and/or backend 218 servers, which may then reply to load balancer 208. This may allow load balancer(s) 208 to reply to account holder device 202 without account holder device 202 ever knowing about the internal separation of functions. It also may prevent account holder devices from contacting backend servers directly, which may have security benefits by hiding the structure of the internal network and preventing attacks on backend 218 or unrelated services running on other ports, for example.

A variety of scheduling algorithms may be used by load balancer(s) 208 to determine which backend server to send a request to. Simple algorithms may include, for example, random choice or round robin. Load balancers 208 also may account for additional factors, such as a server's reported load, recent response times, up/down status (determined by a monitoring poll of some kind), number of active connections, geographic location, capabilities, or how much traffic it has recently been assigned.

Load balancers 208 may be implemented in hardware and/or software. Load balancer(s) 208 may implement numerous features, including, without limitation: asymmetric loading; Priority activation: SSL Offload and Acceleration; Distributed Denial of Service (DDoS) attack protection; HTTP compression; TCP offloading; TCP buffering; direct server return; health checking; HTTP caching; content filtering; HTTP security; priority queuing; rate shaping; content-aware switching; client authentication; programmatic traffic manipulation; firewall; intrusion prevention systems.

Web server(s) 210 may include hardware (e.g., one or more computers) and/or software (e.g., one or more applications) that deliver web content that can be accessed by, for example a client device (e.g., account holder device 202) through a network (e.g., network 204), such as the Internet. In various examples, web servers, may deliver web pages, relating to, for example, online banking applications and the like, to clients (e.g., account holder device 202). Web server(s) 210 may use, for example, a hypertext transfer protocol (HTTP or sHTTP) to communicate with account holder device 202. The web pages delivered to client device may include, for example, HTML documents, which may include images, style sheets and scripts in addition to text content.

A user agent, such as, for example, a web browser, web crawler, or native mobile application, may initiate communication by making a request for a specific resource using HTTP and web server 210 may respond with the content of that resource or an error message if unable to do so. The resource may be, for example a file on stored on backend 218. Web server(s) 210 also may enable or facilitate receiving content from account holder device 202 so account holder device 202 may be able to, for example, submit web forms, including uploading of files.

Web server(s) also may support server-side scripting using, for example, Active Server Pages (ASP), PHP, or other scripting languages. Accordingly, the behavior of web server(s) 210 can be scripted in separate files, while the actual server software remains unchanged.

Load balancers 214 may be similar to load balancers 208 as described above.

Application server(s) 216 may include hardware and/or software that is dedicated to the efficient execution of procedures (e.g., programs, routines, scripts) for supporting its applied applications. Application server(s) 216 may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model. Also, application server(s) 216 may act as a set of components accessible to, for example, a financial institution or other entity implementing system 200, through an API defined by the platform itself. For Web applications, these components may be performed in, for example, the same running environment as web server(s) 210, and application servers 216 may support the construction of dynamic pages. Application server(s) 216 also may implement services, such as, for example, clustering, fail-over, and load-balancing. In various embodiments, where application server(s) 216 are Java application servers, the web server(s) 216 may behaves like an extended virtual machine for running applications, transparently handling connections to databases associated with backend 218 on one side, and, connections to the Web client (e.g., client device 202) on the other.

Backend 218 may include hardware and/or software that enable the backend services of, for example, a financial institution or other entity that maintains a distributed system similar to system 200. For example, backend 218 may include, a system of record, online banking applications, a rewards platform, a payments platform, a lending platform, including the various services associated with, for example, auto and home lending platforms, a statement processing platform, one or more platforms that provide mobile services, one or more platforms that provide online services, a card provisioning platform, a general ledger system, and the like. Backend 218 may be associated with various databases, including account databases that maintain, for example, customer account information, product databases that maintain information about products and services available to customers, content databases that store content associated with, for example, a financial institution, and the like. Backend 218 also may be associated with one or more servers that enable the various services provided by system 200. Backend 218 may enable a financial institution, for example, to implement a fraud system and the various fraud detection and prevention methods as shown and described herein.

FIG. 3 depicts an example method 300 for inter-bank and/or intra-application mobile banking communications and transfer. Method 300 may begin at block 302 and proceed to block 304. In block 304, data indicative of a mobile application and/or website and/or data populating the mobile application and/or website may be transmitted to a requestor device per requestor's instructions. In block 306, a requestor financial institution may receive data associated with requestor-initiated funds transfer. Data associated with a requestor-initiated fund transfer may include a responder name, responder contact details, funds transfer request amount, a reason for funds transfer, requestor account details (e.g., requestor account number, requestor account nickname, requestor account financial institution, and the like), a picture and/or video, and/or an invoice associated with the funds transfer request. The data associated with a requestor-initiated funds transfer may be received, for example, via a messaging platform, mobile banking platform, and/or the like.

At block 308, a requestor financial institution and/or requestor device determines whether the responder is an existing contact. For example, requestor financial institution and/or requestor device may store a list of known responders. Accordingly, responder name and/or responder contact data may be compared against the stored known responder data to determine whether a responder is an existing contact. When a responder is not an existing contact a requestor financial institution may request access to requestor device contacts, both stored locally with requestor device and/or remotely (e.g., in cloud storage or the like). Upon receiving access to requestor contacts, a financial institution system may search the requestor contacts for a name or other responder identifiers (e.g., address, phone number, email address, and the like) for a potential matching contact (block 310). In block 312, the requestor financial institution may transmit data associated with potential matching contacts to the requestor device to present a listing of potential matching contacts that may be the responder(s) associated with the funds transfer request. In block 314, a requestor may select and/or manually input (e.g., via touch screen, mouse click, keyboard, voice command, or the like) the desired responder(s) associated with the funds transfer request. Contact information, including existing contact information may also include whether the responder is an inter-bank customer or an intra-bank customer.

Once responder contact information has been determined and/or when a responder is an existing contact, in block 316, requestor financial institution may translate or otherwise formulate, using, for example application programming interfaces, the request into a funds transfer. For example, where a requestor communications includes a funds transfer request by typing, or speaking into, for example, a microphone associated with a requestor device, "Mom, can I have $25?" a transfer module either on a requestor device or at a financial institution may store the original text for communications as well as translate the request to a funds transfer from Jane Doe for the amount of $25 from a primary account associated with Jane Doe. As another example, where a requestor communications includes a funds transfer request by typing "Bob and Sally, I will pay the $150 cable bill due on the 21st, can you send me your share of the bill?" a transfer module either on a requestor device or at a financial institution may translate the request to a funds transfer from Sally Smith and Bob Berry for the amount of $50 each from primary accounts associated with Sally Smith and Bob Berry on or before the $21^{st}$ of the current month. As an additional example, where a requestor communications includes a funds transfer request by typing "Honey, this TV is $4000, can you transfer the funds so I can buy it today?" a transfer module either on a requestor device or at a financial institution may translate the request to a funds transfer from requestor's spouse for the amount of $4000 each from a primary account associated with requestor's spouse where the request will expire and be automatically deleted at the end of the day. Moreover, the transfer request may include a picture associated with the transfer.

Once a request has been properly translated, a notification may be sent to a responder device regarding the funds transfer request. Using a network, for example, the notification may be transmitted via, for example, a messaging platform, native mobile banking application, and/or the like as shown and described herein. The request may be based on whether the request is an inter-bank funds transfer request and/or an intra-bank funds transfer request (block 318). Where a transfer request is an intra-bank request, a requestor financial institution communication module may transmit an in-app message and/or a website message and include a push notification to alert the responder device that a funds transfer has been requested associated with the responder device (block 320). When a transfer is an inter-bank transfer, a requester financial institution communication module may transmit an email and/or text message to responder device to alert the responder device that a fund transfer has been requested associated with the responder device (block 322). An email and/or text message may include a link to a mobile application and/or website communication associated with the transfer to allow an inter-bank customer to communicate real-time with a requestor to discuss the funds transfer. In this manner, various application programming interfaces (APIs) may be used to enable communications between requestor and/or responder(s).

A responder may then be prompted via a transmission from a financial institution to accept, reply, and/or reject the funds transfer request (block 326). If a responder agrees to execute the funds transfer per the request, a responder may provide financial account details and/or select pre-stored account details associated with an account from which to transfer funds (block 336). A responder may then provide any restrictions associated with the funds transfer (block 338). For example, a restriction may be placed on when and where the transferred funds may be used by the requestor. An example embodiment may perform a funds transfer by generating, in real-time, a gift or prepaid transaction card that may be used at a designated merchant. At block 340, a receipt associated with the funds transfer may be generated and transmitted to the requestor and/or the responder. A receipt may be generated based on a predefined format associated with the requestor financial account and/or responder financial account. For example, if a responder requires a receipt with all restrictions present, a receipt may be generated with all restrictions.

A responder also may reply to the request either with a rejection or a reply (block 328). When a responder replies with a rejection, a requestor financial institution may generate and transmit a reminder (e.g., a calendar reminder) to responder in order to remind responder of the request in case responder wishes to reject the request at the moment but reconsider it at a later date and/or time (block 330). When a responder replies with changes (e.g., a changed amount, an alternative currency such as rewards points or offers, a conditional acceptance as long as requestor agrees to restrictions on when and where the funds may be used, a changed transfer date, an image and/or video, or the like), the responder may transmit a reply to the requestor via the requestor financial institution with any changes (block 332). A requestor may then consider the changes in a communication window and retransmit a new request (block 306). At this point, because a responder communication is established, the method may process as an existing responder and communicate via an in-app or website notification as long as the responder (should the responder be an inter-bank responder) has a communication window open on a responder device. A new funds transfer request may then be translated and transmitted to responder(s) where responder(s) may reply to the funds transfer request according to the methods described above. The method may end at blocks 342 and/or 334.

The above-mentioned methods may be used in a variety of manners including for example, in a traditional funds transfer request, in an auction setting, and/or in multiple responder settings. For example, in an auction setting, a requestor may be an auctioneer and a responder may be an invited participant in the auction. An auctioneer/requestor may set auction details in a request including a maximum bid that may end the auction, a date and/or time that may end the auction, or the like in request data (block 306). Responder/participants may reply to the auction with bids (i.e., changes to the starting request) until either a max bid has been received and/or an end time/date of the auction has been reached. Moreover, as described herein in a multiple responder setting each responder may reply to all and/or reply to a single requestor and/or responder regarding the request (blocks 328-332).

FIG. 4 illustrates example communication interfaces for use with the above methods and/or systems. For example, FIG. 4 illustrates a first device 410 transmitting a funds transfer request 412 "Dad—new class, new $$ needs. Can I have $25 for Chemistry beakers?" This funds transfer request 412 is translated into a request 414 for $25 to be sent to requestor account 416 "Zach Checking" ending in digits 9867. A reply 422 from a second device 420 is illustrated as "Sure, if you mow the lawn when you come next week," sent from the responder, which then is translated into a transfer 424 of $25 to first account 426 "Zach Checking" ending in digits 9867 from a second account 428 "Our Checking" ending in digits 9999. A reply is sent from requestor as "OK. Thanks!" indicating an agreement of terms associated with the funds transfer. At this point the responder may agree to the funds transfer and responder and/or requestor financial institutions may process the transfer accordingly. The communication interfaces shown and described in FIG. 4, for example, may include aspects of a messaging platform, native mobile banking application and/or the like. APIs may integrate the various aspects of the messaging platform and native mobile banking application, for example, to enable inter-bank and intra-bank mobile banking communication and transfers.

It is further noted that the systems and methods described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of storing software, or combinations thereof. Moreover, the figures illustrate various components (e.g., servers, computers, processors, etc.) separately. The functions described as being performed at various components may be performed at other components, and the various components bay be combined or separated. Other modifications also may be made.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It may be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It may be further understood by those within the art that if a specific number of an introduced claim recitation is intended, such an intent may be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It may be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" may be understood to include the possibilities of "A" or "B" or "A and B."

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents.

In the preceding specification, various preferred embodiments have been described with references to the accompanying drawings. It may, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

I claim:
1. A system comprising:
a processor; and
memory, in communication with the processor, and storing instructions that, when executed by the processor, are configured to cause the processor to:
receive, via a requester device associated with a requester, a first message comprising information associated with a responder, the first message being of a first format;
extract, via a first machine learning model (MLM), one or more features from the first message, wherein the one or more features comprise one or more of a name of a person, a title of a person, a request type, a transfer amount, an account name, an account number, or combinations thereof;
determine, via the first MLM, whether the one or more features are associated with a funds transfer request;
responsive to determining that the one or more features are associated with a funds transfer request, translate the first message, via the first MLM, into a second format for completing the funds transfer request by displaying, via a first graphical user interface (GUI) of the requester device, one or more first user input objects based on the one or more features;
receive, via the first GUI of the requester device, one or more first selections associated with the one or more first user input objects;
transmit, to a responder device associated with the responder, the one or more first user input objects and the one or more first selections associated with the one or more first user input objects;
display, via a second GUI of the responder device, the one or more first user input objects and the one or more first selections associated with the one or more first user input objects;
rearrange, via the second GUI of the responder device, at least one of the one or more first user input objects in order to display one or more second user input objects;
receive, via the second GUI of the responder device, one or more modifications to the one or more first selections, and one or more second selections associated with the one or more second user input objects;
responsive to receiving the one or more modifications and the one or more second selections, complete a funds transfer by automatically instructing a server associated with a financial institution associated with the responder to transfer funds from a first financial account associated with the responder to a second financial account associated with the requester; and
store the first message, the one or more first selections, the one or more modifications to the one or more first selections, and the one or more second selections in an archive associated with the requester.

2. The system of claim 1, wherein the instructions are further configured to cause the processor to:
responsive to receiving the one or more modifications and the one or more second selections:
transmit the one or more modifications and the one or more second selections to the first GUI of the requester device; and
display one or more third user input objects via the first GUI of the requester device.

3. The system of claim 2, wherein the instructions are further configured to cause the processor to:
receive one or more third selections associated with the one or more third user input objects via the first GUI of the requester device;
determine whether the requester accepts the one or more modifications and the one or more second selections based on the received one or more third selections;

responsive to determining the requester accepts the one or more modifications and the one or more second selections, complete the funds transfer by automatically instructing the server associated with the financial institution associated with the responder to transfer funds from the first financial account associated with the responder to the second financial account associated with the requester; and responsive to determining the requester does not accept the one or more modifications or the one or more second selections:
- display, via the first GUI of the requester device, one or more fourth user input objects;
- receive, via the first GUI of the requester device, one or more fourth user selections associated with the one or more fourth user input objects;
- transmit, to the responder device, the one or more fourth user input objects and the one or more fourth user selections associated with the one or more fourth user input objects; and
- display, via the second GUI of the responder device, the one or more fourth user input objects and the one or more fourth user selections associated with the one or more fourth user input objects.

4. The system of claim 1, wherein the one or more modifications comprise one or more of a request type, a transfer amount, a location where a funds transfer amount may be used, a time range when a funds transfer amount may be used, a receipt requirement for the funds transfer request, a specific currency for the funds transfer request, a note associated with the funds transfer request, or combinations thereof.

5. The system of claim 1, wherein the instructions are further configured to cause the processor to:
- determine whether the responder is an intra-bank customer by transmitting an inquiry to a financial institution system; and either:
  - transmit the one or more first user input objects and the one or more first selections associated with the one or more first user input objects to the responder device using a financial application in response to determining that the responder is an intra-bank customer; or
  - transmit the one or more first user input objects and the one or more first selections associated with the one or more first user input objects to a responder device using one or more of a text message or an email in response to determining that the responder is not an intra-bank customer.

6. The system of claim 1, wherein the instructions are further configured to cause the processor to:
- determine whether the responder is an existing responder associated with the requester by comparing contact information associated with the responder to stored contact information; and
- responsive to determining that the responder is not an existing responder associated with the requester:
  - search a first list of contacts stored on the requester device and a second list of contacts stored in a remote database associated with the requester;
  - determine whether one or more contacts of the first and second lists of contacts potentially match the information associated with the responder; and
  - responsive to determining one or more contacts potentially match the information associated with the responder:
    - transmit one or more first contacts of the first and second lists of contacts for display via the first GUI of the requester device; and
    - receive, via the first GUI of the requester device, a first selection of a desired responder of the one or more first contacts.

7. A system comprising:
a processor; and
memory, in communication with the processor, and storing instructions that, when executed by the processor, are configured to cause the processor to:
- receive, via a requester device associated with a requester, a first vocal message;
- extract, via a first machine learning model (MLM), one or more features from the first vocal message;
- determine, via the first MLM, that the one or more features are associated with a funds transfer request;
- translate the first vocal message, via the first MLM, into a graphical format for completing the funds transfer request by displaying, via a first graphical user interface (GUI) of the requester device, one or more first user input objects based on the one or more features;
- receive, via the first GUI of the requester device, one or more first selections associated with the one or more first user input objects;
- transmit, to a responder device associated with a responder, the one or more first user input objects and the one or more first selections associated with the one or more first user input objects;
- display, via a second GUI of the responder device, the one or more first user input objects and the one or more first selections associated with the one or more first user input objects;
- rearrange, via the second GUI of the responder device, at least one of the one or more first user input objects in order to display one or more second user input objects;
- receive, via the second GUI of the responder device, one or more modifications to the one or more first selections, and one or more second selections associated with the one or more second user input objects;
- responsive to receiving the one or more modifications and the one or more second selections, complete a funds transfer by automatically instructing a server associated with a financial institution associated with the responder to transfer funds from a first financial account associated with the responder to a second financial account associated with the requester; and
- store the first vocal message, the one or more first selections, the one or more modifications to the one or more first selections, and the one or more second selections in an archive associated with the requester.

8. The system of claim 7, wherein the instructions are further configured to cause the processor to:
- determine whether the responder is an intra-bank customer by transmitting an inquiry to a financial institution system; and either:
  - transmit the one or more first user input objects and the one or more first selections associated with the one or more first user input objects to the responder device using a financial application in response to determining that the responder is an intra-bank customer; or
  - transmit the one or more first user input objects and the one or more first selections associated with the one or more first user input objects to the responder device using one or more of a text message or an email in response to determining that the responder is not an intra-bank customer.

9. The system of claim 7, wherein the first vocal message comprises contact information associated with the responder.

10. The system of claim 7, wherein the one or more features comprise one or more of a name of a person, a title of a person, a request type, a transfer amount, an account name, an account number, or combinations thereof.

11. The system of claim 7, wherein the instructions are further configured to cause the processor to:
determine whether the responder is an existing responder associated with the requester by comparing contact information associated with the responder to stored contact information; and
responsive to determining the responder is not an existing responder associated with the requester:
search a list of contacts associated with the requester;
transmit one or more first contacts of the list of contacts for display via the first GUI of the requester device; and
receive, via the first GUI of the requester device, a first selection of a desired responder of the one or more first contacts.

12. The system of claim 7, wherein the one or more modifications comprise one or more of a request type, a transfer amount, a location where a funds transfer amount may be used, a time range when a funds transfer amount may be used, a receipt requirement for the funds transfer request, a specific currency for the funds transfer request, a note associated with the funds transfer request, or combinations thereof.

13. The system of claim 7, wherein the instructions are further configured to cause the processor to:
responsive to receiving the one or more modifications and the one or more second selections:
transmit the one or more modifications and the one or more second selections via the first GUI of the requester device; and
display one or more third user input objects via the first GUI of the requester device.

14. The system of claim 13, wherein the instructions are further configured to cause the processor to:
receive one or more third selections associated with the one or more third user input objects via the first GUI of the requester device;
determine whether the requester accepts the one or more modifications and the one or more second selections based on the received one or more third selections;
responsive to determining the requester accepts the one or more modifications and the one or more second selections, complete the funds transfer by automatically instructing the server associated with the financial institution associated with the responder to transfer funds from the first financial account associated with the responder to the second financial account associated with the requester; and
responsive to determining the requester does not accept the one or more modifications or the one or more second selections:
display, via the first GUI of the requester device, one or more fourth user input objects;
receive, via the first GUI of the requester device, one or more fourth user selections associated with the one or more fourth user input objects;
transmit, to the second GUI of the responder device, the one or more fourth user input objects and the one or more fourth user selections associated with the one or more fourth user input objects; and
display, via the second GUI of the responder device, the one or more fourth user input objects and the one or more fourth user selections associated with the one or more fourth user input objects.

15. A method comprising:
receiving, via a requestor device associated with a requester, a first vocal message comprising information associated with a responder
extracting, via a first machine learning model (MLM), one or more features from the first vocal message, wherein the one or more features comprise one or more of a name of a person, a title of a person, a request type, a transfer amount, an account name, an account number, or combinations thereof;
determining, via the first MLM, whether the one or more features are associated with a funds transfer request;
responsive to determining the one or more features are associated with the funds transfer request, translating the first vocal message, via the first MLM, into a textual format for completing the funds transfer request by displaying, via a first graphical user interface (GUI) of the requester device, one or more first user input objects based on the one or more features;
receiving, via the first GUI of the requestor device, one or more first selections associated with the one or more first user input objects;
transmitting, to a responder device associated with the responder, the one or more first user input objects and the one or more first selections associated with the one or more first user input objects;
displaying, via a second GUI of the responder device, the one or more first user input objects and the one or more first selections associated with the one or more first user input objects;
rearranging, via the second GUI of the responder device, at least one of the one or more first user input objects in order to display one or more second user input objects;
receiving, via the second GUI of the responder device, one or more modifications to the one or more first selections, and one or more second selections associated with the second user input objects;
responsive to receiving the one or more modifications and the one or more second selections, completing a funds transfer by automatically instructing a server associated with a financial institution associated with the responder to transfer funds from a first financial account associated with the responder to a second financial account associated with the requester; and
store the first vocal message, the one or more first selections, the one or more modifications to the one or more first selections, and the one or more second selections in an archive associated with the requester.

16. The method of claim 15, further comprising:
determining whether the responder is an existing responder associated with the requester by comparing contact information associated with the responder to stored contact information; and
responsive to determining that the responder is not an existing responder associated with the requester:
searching a list of contacts associated with the requester;

transmitting one or more first contacts of the list of contacts for display via the first GUI of the requester device; and receiving, via the first GUI of the requester device, a first selection of a desired responder of the one or more first contacts.

17. The method of claim 15, further comprising:

responsive to receiving the one or more modifications and the one or more second selections:

transmitting the one or more modifications and the one or more second selections to the first GUI of the requester device; and displaying one or more third user input objects via the first GUI of the requester device.

18. The method of claim 17, further comprising:

receiving one or more third selections of the one or more third user input objects via the first GUI of the requester device;

determining whether the requester accepts the one or more modifications and the one or more second selections based on the received one or more third selections;

responsive to determining the requester accepts the one or more modifications and the one or more second selections, completing the funds transfer by automatically instructing the server associated with the financial institution associated with the responder to transfer funds from the first financial account associated with the responder to the second financial account associated with the requester; and responsive to determining the requester does not accept the one or more modifications or the one or more second selections:

displaying, via the first GUI of the requester device, one or more fourth user input objects;

receiving, via the first GUI of the requester device, one or more fourth user selections associated with the one or more fourth user input objects;

transmitting, to the responder device, the one or more fourth user input objects and the one or more fourth user selections associated with the one or more fourth user input objects; and displaying, via the second GUI of the responder device, the one or more fourth user input objects and the one or more fourth user selections associated with the one or more fourth user input objects.

* * * * *